S. W. MARTIN.
PLANT CHOPPER.
APPLICATION FILED SEPT. 9, 1918.
1,311,411.
Patented July 29, 1919.
2 SHEETS—SHEET 1.
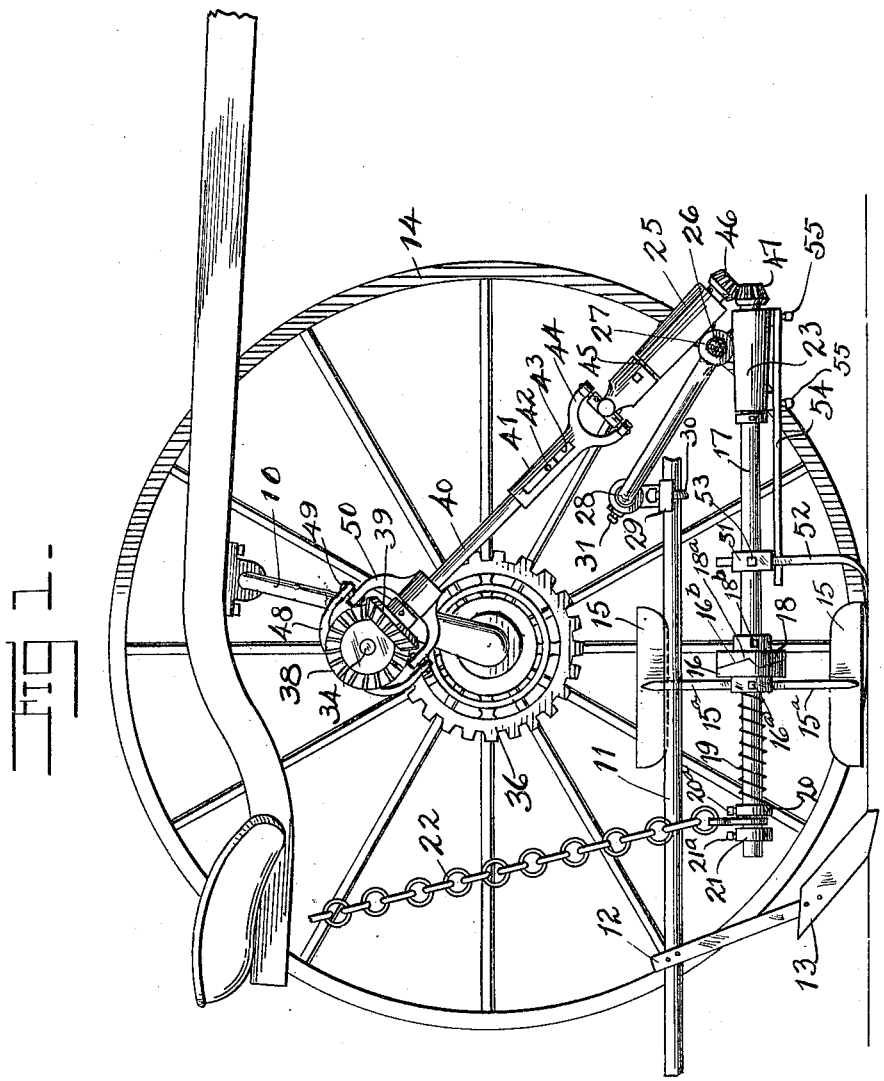
Inventor
S. W. Martin

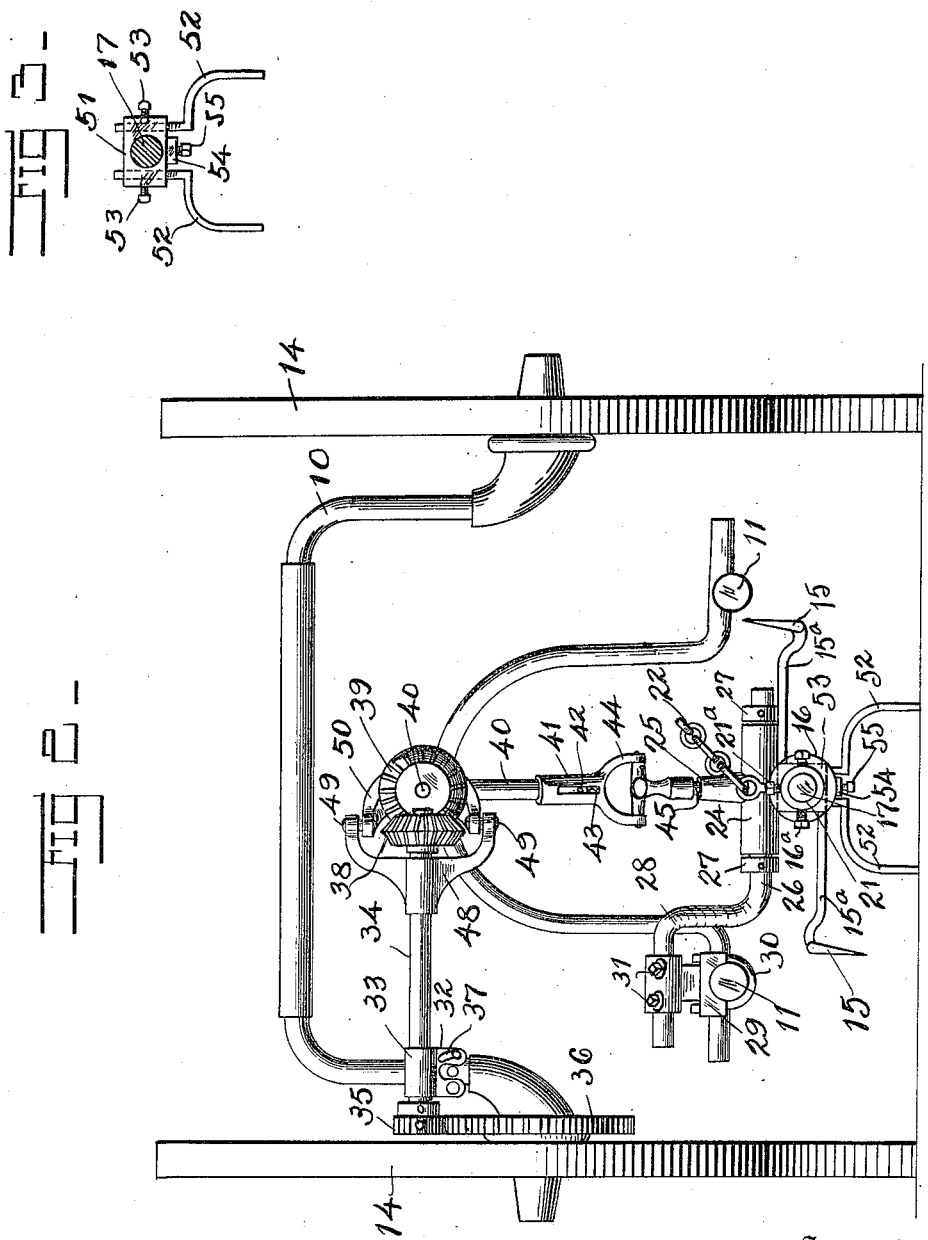

UNITED STATES PATENT OFFICE.

SILAS W. MARTIN, OF OGLESBY, TEXAS.

PLANT-CHOPPER.

1,311,411. Specification of Letters Patent. Patented July 29, 1919.

Application filed September 9, 1918. Serial No. 253,303.

*To all whom it may concern:*

Be it known that I, SILAS W. MARTIN, a citizen of the United States, residing at Oglesby, in the county of Corvell and State of Texas, have invented new and useful Improvements in Plant-Choppers, of which the following is a specification.

This invention relates to implements for chopping cotton and other crops which are planted in rows, for the purpose of thinning out the rows by removing the plants at regular intervals in the rows, the remaining plants being left in stands spaced apart a suitable distance.

The invention has for its object to provide an implement of the kind stated which is simple in construction and highly efficient in operation, certain adjustments, to be hereinafter described in detail, being readily made.

The invention also has for its object to provide a plant chopper which is in the nature of an attachment readily applicable to any ordinary or standard cultivator.

With the objects stated in view, the invention consists in a novel combination and arrangement of parts to be hereinafter described and claimed, and in order that the same may be better understood, reference is had to the accompanying drawing forming a part of this specification.

The preferred embodiment of the invention has been illustrated, but it will be understood that various changes and modifications in the structural details may be made without a departure from the spirit and scope of the invention as claimed hereinafter.

In the drawing, Figure 1 is a side elevation showing the application of the invention to a clutivator, only so much of the latter being shown as will suffice to make clear the connection of the invention therewith;

Fig. 2 is a rear elevation of the parts shown in Fig. 1; and

Fig. 3 is an elevation of a gage device.

Referring specifically to the drawings, 10 denoted the arched axle of a riding cultivator of the "wiggle tail" or "pivot seat" type. The invention is shown applied to a standard cultivator of this type, but it is to be understood that it is not limited thereto, but may, with equal facility be applied to various other types and kinds of cultivators. The cultivator is shown equipped with two beams 11 carrying the standards 12 of the shovels 13, and as usual, the beams can be raised to take the shovels out of the ground. This lift has not been shown as it is a common expedient well known to those skilled in the art. The downturned ends of the axle 10 carry the ground wheels 14 of the machine.

The chopper attachment consists of two hoe blades 15 carried by shanks 15ª held in sockets in a collar 16 by set screws 16ª. On one side of this collar are clutch teeth 16ᵇ, and the collar is loose and slidable on a shaft 17. On this shaft is fastened a clutch member 18 having teeth 18ª to fit the teeth 16ᵇ, and hence when the shaft is in motion, the collar 16 rotates to operate the blades 15. The clutch member 18 is made fast to the shaft 17 by a set screw 18ᵇ. The two clutch members are held in mesh by a spring 19 bearing at one end against the clutch member 16, and abutting at its other end against a collar 20 fastened on the shaft 17 by a set screw 20ª. Adjacent to the collar 20 is a second collar 21, also fixed to the shaft 17 by a set screw 21ª. Between these two collars, the shaft 17 is engaged by a chain 22 for a purpose to be presently described.

The hereinbefore described clutch members 16 and 18 provide a yieldable driving connection between the shaft 17 and the hoes 15 to prevent injury of the latter if they should meet with rocks, roots or other obstructions. Each clutch member has only two teeth, in view of which it will be evident that if the clutch members become disengaged, the hoes will travel ahead with the machine and again come into action without varying the uniformity in the spacing of the hills.

The support and driving means of the shaft 17 comprise the following parts:

The rear end of the shaft 17 is held suspended by the chain 22, and its forward end is supported in a bearing sleeve 23 having at the top a tubular cross member 24 projecting from opposite sides thereof and formed intermediate its ends with a bearing sleeve 25 extending at an oblique angle to the sleeve 23.

Through the cross member 24 passes a shaft 26, longitudinal movement of the former being prevented by set collars 27. This shaft has a crank bend 28 at one end, said bend being located above one of the beams 11 and secured thereto. The means for securing the crank bend to the beam consists of a boxing 29 fastened to the beams by a U-bolt 30, the crank bend passing through the boxing and being held by set screws 31.

The shaft 26 is stationary and provides a pivotal support for the bearing sleeve 23, and as this sleeve supports the shaft 17, it will be evident that the latter can be swung up or down to bring the hoe blades 15 at the proper height.

On one of the downturned ends of the axle 10 is secured by a clamp 32, a boxing 33 in which is supported a shaft 34 having at one end a pinion 35 which is in mesh with a spur gear 36 fastened to one of the wheels 14 to turn therewith, whereby the motion of said wheel is transmitted to the shaft 34. The boxing 33 is adjustable so that the shaft 34 may be leveled, this being accomplished by making one of the bolt holes of the clamp 32 in the form of an arcuate slot 37.

On the outer end of the shaft 34 is made fast a bevel gear 38 which is in mesh with a bevel gear 39 fast on a shaft 40 having a sliding connection with a tubular shaft section 41, the shaft 40 being telescopically mounted in the latter. In order that the shaft section 41 may turn with the shaft 40, the latter has laterally projecting pins 42 seating in longitudinal slots 43 in the former.

The shaft section 41 is flexibly connected by a universal joint 44 of standard design to a shaft 45 journaled in the bearing sleeve 25. The motion of the shaft 45 is transmitted to the chopper shaft 17 by a bevel gear 46 on the former meshing with a bevel gear 47 on the latter. The motion of the drive shaft 34 is therefore transmitted to the chopper shaft 17 through the gears 38 and 39, shaft 40, shaft section 41, universal joint 44, shaft 45, and gears 46 and 47. The gear 38 has two sets of teeth differing in numbers of teeth, so that a change of speed may be had by reversing the position of the gear on its shaft.

On the outer end of the shaft 34 is a yoke 48 having its branches pivoted, as shown at 49, to the branches of a yoke 50 on the upper end of the shaft 40. The shafts are not made fast to the yokes but are free to turn therein. These yokes provide a support for the upper end of the shaft 40.

On the shaft 17 is loosely mounted a block 51 carrying two laterally spaced arched gage bars 52 which extend downward to have their lower ends trail along the ground. The shanks of the gage bars seat in sockets in the block 51 and are held in vertically adjusted position by set screws 53. On the under side of the bearing sleeve 23 is fastened one end of a bar 54 having its other end fastened to the under side of the block 51 the fastenings being made by screws 55.

The bar 54 holds the block 51 stationary with respect to the shaft 17.

The gage bars 52 have sufficient spread to straddle the row of plants and not injure the same, and they are located in front of the chopper blades 15. As the shaft 17 is pivotally supported or floating as it were, it being held up by the gage bars 52, the latter determine the range of action of the blades 15, and as the gage bars are vertically adjustable, they can be set to position the blades at any desired height so as to run uniformly just above the surface of the ground to scrape, or to cut any reasonable depth into the soil. By employing the gage bars, the blades will not leave the soil in low places or cut too deep in high places or in crossing trenches, but they operate at all times at the same uniform level irrespective of the roughness or unevenness of the ground. The flexible driving connection enables the shaft 17 to freely rise and fall to follow the gage bars, without the driving means getting out of gear. The chain 22 allows the shaft 17 to be elevated manually through skippy cotton or forage plants, such as Kafir corn, maize and sorghum, and the shaft can also be elevated sufficiently to take the chopper blades out or off the ground when the machine is making a turn.

The chopper attachment is very simple in construction and it is highly efficient and reliable in operation, and therefore effectually serves the purpose for which it is designed. The attachment can also be readily applied to the cultivator without any changes in the construction of the latter. The chopper is held midway between the cultivator beams, making it impossible to cultivate the plants without chopping, or to chop the plants without properly cultivating the same.

I claim:

1. A plant chopper comprising a rotatable shaft armed with chopper blades, a pair of connected bearing members in one of which the aforesaid shaft is supported, a shaft supported by the other bearing member, and geared to the first mentioned shaft, a pivotal support for the bearing members to permit a rising and falling motion of the first mentioned shaft, and flexible driving means for the second mentioned shaft.

2. A plant chopper comprising a rotatable shaft armed with chopper blades, a pair of connected bearing members in one of which one end of the shaft is supported, a shaft supported by the other bearing member, and geared to the first mentioned shaft, a pivotal support for the bearing members to permit a rising and falling motion of the first mentioned shaft, a third shaft having a flexible and longitudinally yieldable connection with the second mentioned shaft, driving means for the third mentioned shaft, and a gage bar carried by the first mentioned shaft and depending therefrom to trail along the ground.

3. A plant chopper comprising a rotatable shaft armed with chopper blades, a pair of connected bearing members in one of which one end of the shaft is supported, a shaft supported by the other bearing member, and geared to the first mentioned shaft, a pivotal support for the bearing members to permit a rising and falling motion of the first mentioned shaft, a third shaft having a flexible and longitudinally yieldable connection with the second mentioned shaft, a drive shaft geared to the third mentioned shaft, bearings through which the adjacent ends of the third mentioned and the drive shafts pass, a pivotal connection between the bearings, and a gage bar carried by the first mentioned shaft and depending therefrom to trail along the ground.

In testimony whereof I affix my signature.

SILAS W. MARTIN.

Copies of this patent may be obtained for five cents each, by addressing the "Commissioner of Patents, Washington, D. C."